US 12,467,519 B2

(12) United States Patent
Wu

(10) Patent No.: US 12,467,519 B2
(45) Date of Patent: Nov. 11, 2025

(54) RECIPROCATING MECHANISM FOR DRIVING SYNCHRONOUS BELT THROUGH FORWARD AND REVERSE ROTATION OF MOTOR

(71) Applicants: DONG GUAN HANJING ELECTRONIC TECHNOLOGY CO., LTD, Dongguan (CN); SHEN ZHEN MOWU TECHNOLOGY CO., LTD, Shenzhen (CN)

(72) Inventor: Bin Wu, Dongguan (CN)

(73) Assignees: Dong Guan Hanjing Electronic Technology Co., Ltd, Dongguan (CN); Shen Zhen Mowu Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/718,899

(22) PCT Filed: Jul. 7, 2022

(86) PCT No.: PCT/CN2022/104298
§ 371 (c)(1),
(2) Date: Jun. 12, 2024

(87) PCT Pub. No.: WO2023/130699
PCT Pub. Date: Jul. 13, 2023

(65) Prior Publication Data
US 2025/0052303 A1     Feb. 13, 2025

(30) Foreign Application Priority Data
Jan. 4, 2022  (CN) .......................... 202210001120.8

(51) Int. Cl.
*F16H 19/06*     (2006.01)
*F16M 13/02*     (2006.01)
(Continued)

(52) U.S. Cl.
CPC ............. *F16H 19/06* (2013.01); *F16M 13/02* (2013.01); *H02K 7/1004* (2013.01);
(Continued)

(58) Field of Classification Search
CPC ............ F16H 19/06; F16H 2019/0686; H02K 11/215
See application file for complete search history.

(56) References Cited

U.S. PATENT DOCUMENTS 11,821,495 B2 *   11/2023  Bedord ................ A47L 11/4069
2014/0231176 A1 *  8/2014  Zanichelli ................ B66F 9/08
                                                     187/226

FOREIGN PATENT DOCUMENTS

CN     102418777 A     4/2012
CN     103932790 A     7/2014
(Continued)

OTHER PUBLICATIONS

International Search Report and Written Opinion for Application No. PCT/CN2022/104298 dated Aug. 30, 2022 (16 pages with machine translation).

*Primary Examiner* — Jake Cook
(74) *Attorney, Agent, or Firm* — Michael Best & Friedrich LLP

(57) ABSTRACT

A reciprocating mechanism for driving a synchronous belt through forward and reverse rotation of a motor comprises: a mounting bracket, a motor, a grating, a slot-type opposing photoelectric switch, a control board, a Hall switch, a load, and a magnet. The mounting bracket is equipped with a driving wheel and a driven wheel, which driving wheel is connected to the driven wheel through the synchronous belt. A side of the mounting bracket is provided with the motor. An output shaft of the motor is connected to the driving wheel and extends to the other side of the mounting bracket. The other side of the mounting bracket is provided with the control board which is functionally connected to the motor.

(Continued)

A lower end of the control board is provided with the slot-type opposing photoelectric switch which mates with the grating mounted on a free end of the output shaft of the motor. A plurality of the Hall switches are uniformly distributed along a length direction on a side face of the control board adjacent to the mounting bracket. The synchronous belt is provided with a load. A side of the load adjacent to the control board is provided with the magnet mating with the Hall switch. The present invention is characterized by a variable stroke, a long stroke, a low noise and smooth motion.

10 Claims, 2 Drawing Sheets

(51) Int. Cl.
*H02K 7/10* (2006.01)
*H02K 11/215* (2016.01)
*H02K 11/22* (2016.01)

(52) U.S. Cl.
CPC ........... *H02K 11/215* (2016.01); *H02K 11/22* (2016.01); *F16H 2019/0686* (2013.01); *H02K 2211/03* (2013.01)

(56) References Cited

FOREIGN PATENT DOCUMENTS

| | | |
|---|---|---|
| CN | 203794094 U | 8/2014 |
| CN | 107642587 A | 1/2018 |
| CN | 207226352 U | 4/2018 |
| CN | 110094618 A | 8/2019 |
| CN | 212413024 U | 1/2021 |
| CN | 114294389 A | 4/2022 |
| EP | 2110201 A1 | 10/2009 |

\* cited by examiner

RECIPROCATING MECHANISM FOR DRIVING SYNCHRONOUS BELT THROUGH FORWARD AND REVERSE ROTATION OF MOTOR

TECHNICAL FIELD

The present invention relates to the technical field of motor drive structures, and particularly to a reciprocating mechanism for driving a synchronous belt through forward and reverse rotation of a motor.

BACKGROUND ART

With people's pursuit of a better life as well as the application of AI technology and the popularization of artificial intelligence products, intelligent robots, massagers, sports equipment, electronic beauty products and the like will have reciprocating mechanisms to achieve certain specific functions.

The reciprocating mechanism in the prior art includes a motor and an eccentric wheel which is driven by the motor and connected to a load through a connecting rod. The reciprocating mechanism with such structure has the following technical problems: 1. It has an invariable stroke and can only make reciprocating motion within the same stroke: 2. It has relatively great limitations on the reciprocating stroke, a short stroke and limited application: 3. The eccentric wheel and the motor are not concentric, resulting in rather great resistance during the motion, easy jamming and relatively loud noise, thereby making it impossible to meet people's increasingly high requirements for the reciprocating mechanism.

Therefore, the prior art remains to be improved and enhanced.

SUMMARY OF THE INVENTION

In response to the deficiencies underlying the prior art, the object of the present invention is to provide a reciprocating mechanism with a variable stroke, low noise, long stroke, and a wide range of applications, for driving a synchronous belt through forward and reverse rotation of a motor.

The aforementioned object of the present invention is achieved through the following technical means:

a reciprocating mechanism for driving a synchronous belt through forward and reverse rotation of a motor, comprising: a mounting bracket, a motor, a grating, a slot-type opposing photoelectric switch, a control board, a Hall switch, a load, and a magnet. The mounting bracket is equipped with a driving wheel and a driven wheel. The driving wheel is connected to the driven wheel through a synchronous belt. A side of the mounting bracket is provided with the motor. An output shaft of the motor is connected to the driving wheel and extends to the other side of the mounting bracket. The other side of the mounting bracket is provided with the control board which is functionally connected to the motor. A lower end of the control board is provided with the slot-type opposing photoelectric switch that mates with the grating mounted on a free end of the output shaft of the motor. A plurality of the Hall switches are uniformly distributed along a length direction on a side face of the control board adjacent to the mounting bracket. The synchronous belt is provided with a load. A side of the load adjacent to the control board is provided with the magnet that mates with the Hall switch.

Preferably, the grating is a 16-grid grating.

Preferably, the mounting bracket comprises a base, a top plate, and metal guide rods, with two metal guide rods arranged in parallel between the base and the top plate.

Preferably, the load comprises a load body and a synchronous belt toothed drive portion that engages with the synchronous belt. The synchronous belt toothed drive portion is securely connected to the load body, and is provided with the magnet that mates with the Hall switch.

Preferably, the synchronous belt toothed drive portion has two through holes. The metal guide rods are disposed within respective through holes.

Compared with the prior art, the advantageous effects of the present invention are as follows.

1. The stroke is variable. The motor urges the synchronous belt to drive the load to make reciprocating motion through forward and reverse rotation. When the load stops at a certain position, the Hall switch on the control board senses the magnet on the load, before transmitting a signal to the control board, such that the control board is clear about the position of the load. The grating on the output shaft of the motor is arranged to mate with the slot-type opposing photoelectric switch on the control board, such that the control board controls the motor to rotate different numbers of turns, thereby achieving different running strokes and distances of the load.
2. The stroke is long, without being limited by the size of the eccentric wheel.
3. The driving wheel of the synchronous belt and the output shaft of the motor are concentric and identical in stress point. There will be no resistance caused by the eccentric wheel and the motor being not concentric, and the running is smooth. Besides, the synchronous belt can reduce friction and noise, and ensure smooth motion.

The various reference signs in the figures are: (1) mounting bracket, (2) motor, (3) grating, (4) slot-type opposing photoelectric switch, (5) control board, (6) Hall switch, (7) load, (8) magnet, (9) driving wheel, (10) synchronous belt, (11) base, (12) top plate, (13) metal guide rod, (14) load body, (15) synchronous belt toothed drive portion, (16) through hole, respectively.

DETAILED DESCRIPTION

The technical solutions in the embodiments of the present invention will be clearly and completely described below in conjunction with the accompanying drawings in the embodiments of the present invention. Obviously, the described embodiments are only a part of the embodiments of the present invention, not all of them. All other embodiments obtained by a person of ordinary skill in the art based on the embodiments in the present invention without creative efforts shall fall within the protection scope of the present invention.

Figure 1:
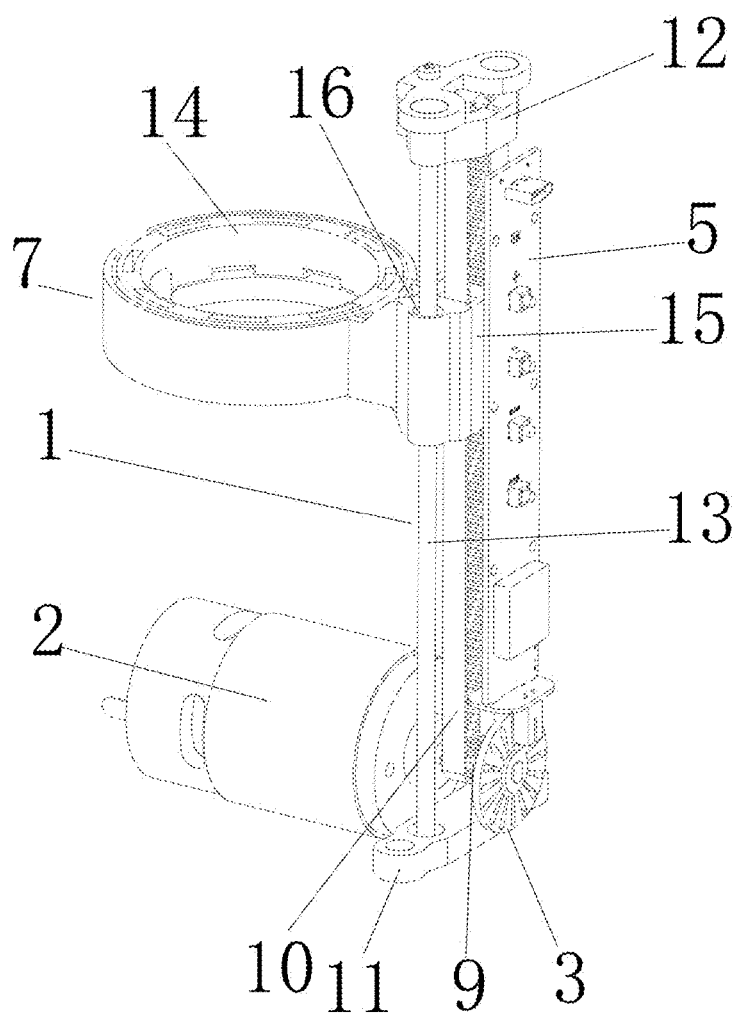
FIG. 1 is a structural diagram of the present invention.
Figure 2:
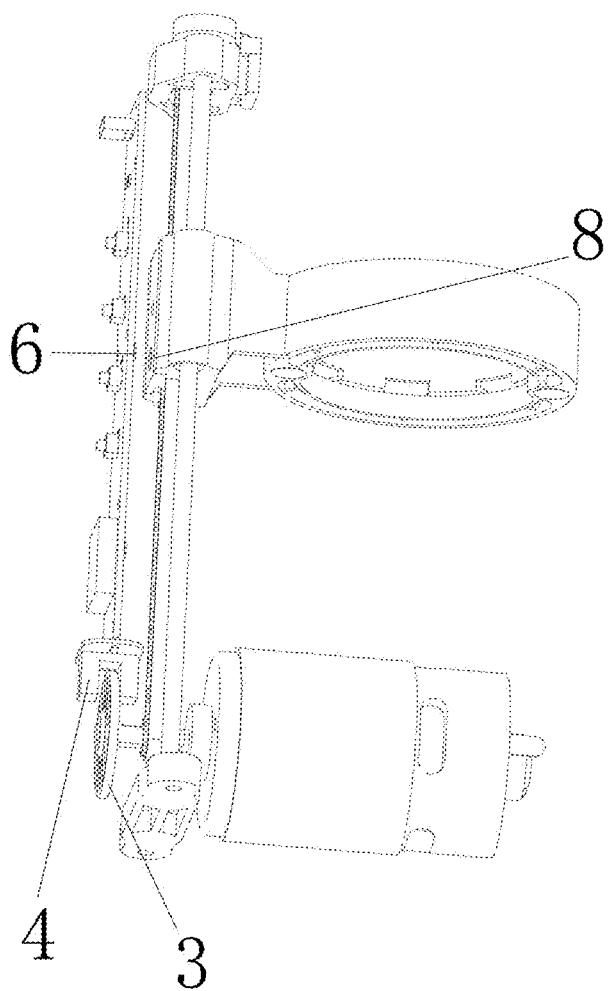
FIG. 2 is another structural diagram of the present invention.

With reference to FIGS. 1 and 2, a reciprocating mechanism for driving a synchronous belt by a motor according to the present invention comprises: a mounting bracket 1, a motor 2, a grating 3, a slot-type opposing photoelectric switch 4, a control board 5, a Hall switch 6, a load 7, and a magnet 8. The mounting bracket 1 is equipped with a driving wheel 9 and a driven wheel (not shown in the figures). The driving wheel 9 is connected to the driven wheel through a synchronous belt 10. A side of the mounting bracket 1 is provided with the motor 2. An output shaft of the motor 2 is connected to the driving wheel 9 and extends to the other side of the mounting bracket 1. The other side of the mounting bracket 1 is provided with the control board 5 which is functionally connected to the motor 2. The lower end of the control board 5 is provided with the slot-type opposing photoelectric switch 4 that mates with the grating 3 mounted on the free end of the output shaft of the motor 2. The grating is a 16-grid grating. A plurality of Hall switches 6 are uniformly distributed along a length direction on a side face of the control board 5 adjacent to the mounting bracket 1. The synchronous belt 10 is provided with a load 7. A side of the load 7 adjacent to the control board is provided with the magnet 8 that mates with the Hall switch 6.

In operation according to the present invention, the motor 2 drives the driving wheel 9 to rotate: the driving wheel 9 drives the synchronous belt 10 to rotate; and the synchronous belt 10 drives the load 7 to make reciprocating motion. When the motor 2 stops working, the load 7 stops at a certain position. The Hall switch 6 on control board 5 senses the magnet 8 on the load 7, before transmitting a signal to the control board, such that control board 5 is clear about the position of the load 7. At the same time, the motor 2 drives the grating 3 to rotate. Since the grating 3 mates with the slot-type opposing photoelectric switch 4 of the control board 5, the control board 5 is also clear about the number of turns that the motor 2 rotates. When the load 7 has different stroke requirements, the control board 5 controls the motor 2 to rotate different numbers of turns so as to achieve different running distances of the load. The load 7 according to the present invention has a long stroke, without being limited by the size of the eccentric wheel. Moreover, the driving wheel of the synchronous belt and the output shaft of the motor are concentric and identical in stress point. There will be no resistance caused by the eccentric wheel and the motor not being concentric, and the running is smooth. The synchronous belt can reduce friction and noise and ensure smooth motion.

The mounting bracket 1 includes a base 11, a top plate 12, and metal guide rods 13. Two metal guide rods 13 are arranged in parallel between the base 11 and the top plate 12.

The load 7 includes a load body 14 and a synchronous belt toothed drive portion 15 that engages with the synchronous belt 10. The synchronous belt toothed drive portion 15 is securely connected to the load body 14, and is provided with the magnet 8 that mates with the Hall switch 6.

The synchronous belt toothed drive portion 15 has two through holes 16. The metal guide rods 13 are arranged within respective through holes 16, for orientation of the synchronous belt toothed drive portion 15.

The present invention can implement a reciprocating hybrid mode on the mechanism through software programming and APP, and achieve customized motion trajectory through human-machine interaction.

In summary; the present invention solves the deficiencies underlying the prior art through the above structural design, and is characterized by a reasonable structure, a variable stroke, a low noise and the like. It is widely applicable to such fields as intelligent robots, massagers, sports equipment and electronic beauty products.

Although the embodiments of the present invention have been illustrated and described, it could be appreciated by a person of ordinary skill in the art that multiple variations, modifications, substitutions, and alterations can be made to these embodiments without departing from the principles and spirit of the present invention. The scope of the present invention is defined by the claims attached and their equivalents.

The invention claimed is:

1. A reciprocating mechanism for driving a synchronous belt through forward and reverse rotation of a motor, the reciprocating mechanism comprising:
   a mounting bracket,
   a motor, a grating,
   a slot-type opposing photoelectric switch,
   a control board,
   a Hall switch,
   a load, and
   a magnet,
   wherein the mounting bracket is equipped with a driving wheel and a driven wheel, the driving wheel connected to the driven wheel through the synchronous belt,
   wherein a side of the mounting bracket is provided with the motor, an output shaft of the motor connected to the driving wheel and extending to the other side of the mounting bracket, the other side of the mounting bracket provided with the control board, the control board functionally connected to the motor,
   wherein a lower end of the control board is provided with the slot-type opposing photoelectric switch mating with the grating mounted on a free end of the output shaft of the motor;
   wherein the Hall switch is one of a plurality of Hall switches uniformly distributed along a length direction on a side face of the control board adjacent to the mounting bracket, and
   wherein the synchronous belt is provided with the load, a side of the load adjacent to the control board provided with the magnet mating with the Hall switch.

2. The reciprocating mechanism for driving a synchronous belt through forward and reverse rotation of a motor according to claim 1, wherein the grating of the motor is a 16-grid grating.

3. The reciprocating mechanism for driving a synchronous belt through forward and reverse rotation of a motor according to claim 1, wherein the mounting bracket comprises a base, a top plate, and two metal guide rods arranged in parallel between the base and the top plate.

4. The reciprocating mechanism for driving a synchronous belt through forward and reverse rotation of a motor according to claim 1, wherein the load comprises:
   a load body; and
   a synchronous belt toothed drive portion engaging with the synchronous belt,
   wherein the synchronous belt toothed drive portion is securely connected to the load body and is provided with the magnet mating with the Hall switch.

5. The reciprocating mechanism for driving a synchronous belt through forward and reverse rotation of a motor according to claim 4, wherein the synchronous belt toothed drive portion has two through holes, and two metal guide rods arranged within respective through holes and positioned parallel between the base and the top plate.

6. The reciprocating mechanism for driving a synchronous belt through forward and reverse rotation of a motor according to claim 1, wherein the driving wheel of the synchronous belt is concentric with the output shaft of the motor.

7. The reciprocating mechanism for driving a synchronous belt through forward and reverse rotation of a motor according to claim 1, wherein when the load stops at a certain position, the Hall switch on the control board senses the magnet on the load, before transmitting a signal to the control board, such that the control board is clear about the position of the load.

8. The reciprocating mechanism for driving a synchronous belt through forward and reverse rotation of a motor according to claim 7, wherein at the same time the motor drives the grating to rotate, and since the grating mates with the slot-type opposing photoelectric switch of the control board, the control board is also clear about the number of turns the motor rotates.

9. The reciprocating mechanism for driving a synchronous belt through forward and reverse rotation of a motor according to claim 8, wherein the grating on the output shaft of the motor is arranged to mate with the slot-type opposing photoelectric switch on the control board, such that the control board can control the motor to rotate different numbers of turns, thereby achieving different running distances of the load.

10. The reciprocating mechanism for driving a synchronous belt through forward and reverse rotation of a motor according to claim 1, wherein the motor urges the synchronous belt to drive the load to make reciprocating motion through forward and reverse rotation.

\* \* \* \* \*